US011904444B1

(12) United States Patent
Jenkins

(10) Patent No.: US 11,904,444 B1
(45) Date of Patent: Feb. 20, 2024

(54) ADJUSTABLE PLIERS WITH THREAD-ENGAGING MEANS

(71) Applicant: Lanard Jenkins, Compton, CA (US)

(72) Inventor: Lanard Jenkins, Compton, CA (US)

( * ) Notice: Subject to any disclaimer, the term of this patent is extended or adjusted under 35 U.S.C. 154(b) by 162 days.

(21) Appl. No.: 17/498,809

(22) Filed: Oct. 12, 2021

(51) Int. Cl.
*B25B 7/10* (2006.01)
*B25B 7/02* (2006.01)

(52) U.S. Cl.
CPC . *B25B 7/10* (2013.01); *B25B 7/02* (2013.01)

(58) Field of Classification Search
CPC .................................... B25B 7/10; B25B 7/02
USPC .................................................... 81/423, 417
See application file for complete search history.

(56) References Cited

U.S. PATENT DOCUMENTS 1,766,459 A * 6/1930 Schweigert ............... B25B 7/04 81/186
3,176,551 A * 4/1965 Hansen ..................... B25B 7/14 81/341
4,318,316 A * 3/1982 Guilliams ................. B25B 7/02 81/367
7,610,833 B2 * 11/2009 McCabe ............... B25B 23/103 81/53.2
8,656,812 B2 2/2014 Kawai et al.
10,583,541 B2 3/2020 Bridges et al.
2008/0163729 A1 7/2008 Stevens
2012/0318107 A1 * 12/2012 Mann ........................ B25B 7/14 81/319
2016/0184980 A1 6/2016 Takasaki
2017/0274505 A1 9/2017 Weil
2019/0076994 A1 3/2019 Blumenthal et al.

* cited by examiner

*Primary Examiner* — Hadi Shakeri
(74) *Attorney, Agent, or Firm* — Kyle A. Fletcher, Esq.

(57) ABSTRACT

The adjustable pliers with thread-engaging means comprises water pump pliers and a thread-engaging means. The water pump pliers may be slip joint pliers whose fulcrum may be moved to modify the distance that the plier's jaws may open. The jaws may be angled with respect to a central axis of the water pump pliers. The thread-engaging means may comprise opposing arcuate grooves that are longitudinally oriented on a first jaw and on a second jaw. The thread-engaging means may be operable to grasp a threaded element that is held between the first jaw and the second jaw and is laterally oriented relative to the water pump pliers without damaging threads of the threaded element. As non-limiting examples, the threaded element may be a bolt, a screw, or a threaded rod.

13 Claims, 4 Drawing Sheets

ADJUSTABLE PLIERS WITH THREAD-ENGAGING MEANS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanics tools, more specifically, adjustable pliers with thread-engaging means.

SUMMARY OF INVENTION

The adjustable pliers with thread-engaging means comprises water pump pliers and a thread-engaging means. The water pump pliers may be slip joint pliers whose fulcrum may be moved to modify the distance that the plier's jaws may open. The jaws may be angled with respect to a central axis of the water pump pliers. The thread-engaging means may comprise opposing arcuate grooves that are longitudinally oriented on a first jaw and on a second jaw. The thread-engaging means may be operable to grasp a threaded element that is held between the first jaw and the second jaw and is laterally oriented relative to the water pump pliers without damaging threads of the threaded element. As non-limiting examples, the threaded element may be a bolt, a screw, or a threaded rod.

An object of the invention is to provide water pump pliers whose fulcrum may be moved to modify the distance that the plier's jaws may open.

Another object of the invention is to provide a first threaded surface and a second threaded surface located on opposing jaws and operable to hold a threaded element in the jaws without damaging the threads of the threaded element.

A further object of the invention is to provide a first flat serrated surface and a second flat serrated surface located on opposing jaws and both comprising a flat surface with lateral teeth for holding an item between the jaws.

Yet another object of the invention is to provide a first curved serrated surface and a second curved serrated surface located on opposing jaws and both comprising a curved surface with lateral teeth for holding an item between the jaws.

These together with additional objects, features and advantages of the adjustable pliers with thread-engaging means will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable pliers with thread-engaging means in detail, it is to be understood that the adjustable pliers with thread-engaging means is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable pliers with thread-engaging means.

It is therefore important that the claims be regarded as including such equivalent construction insofar as they do not depart from the spirit and scope of the adjustable pliers with thread-engaging means. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
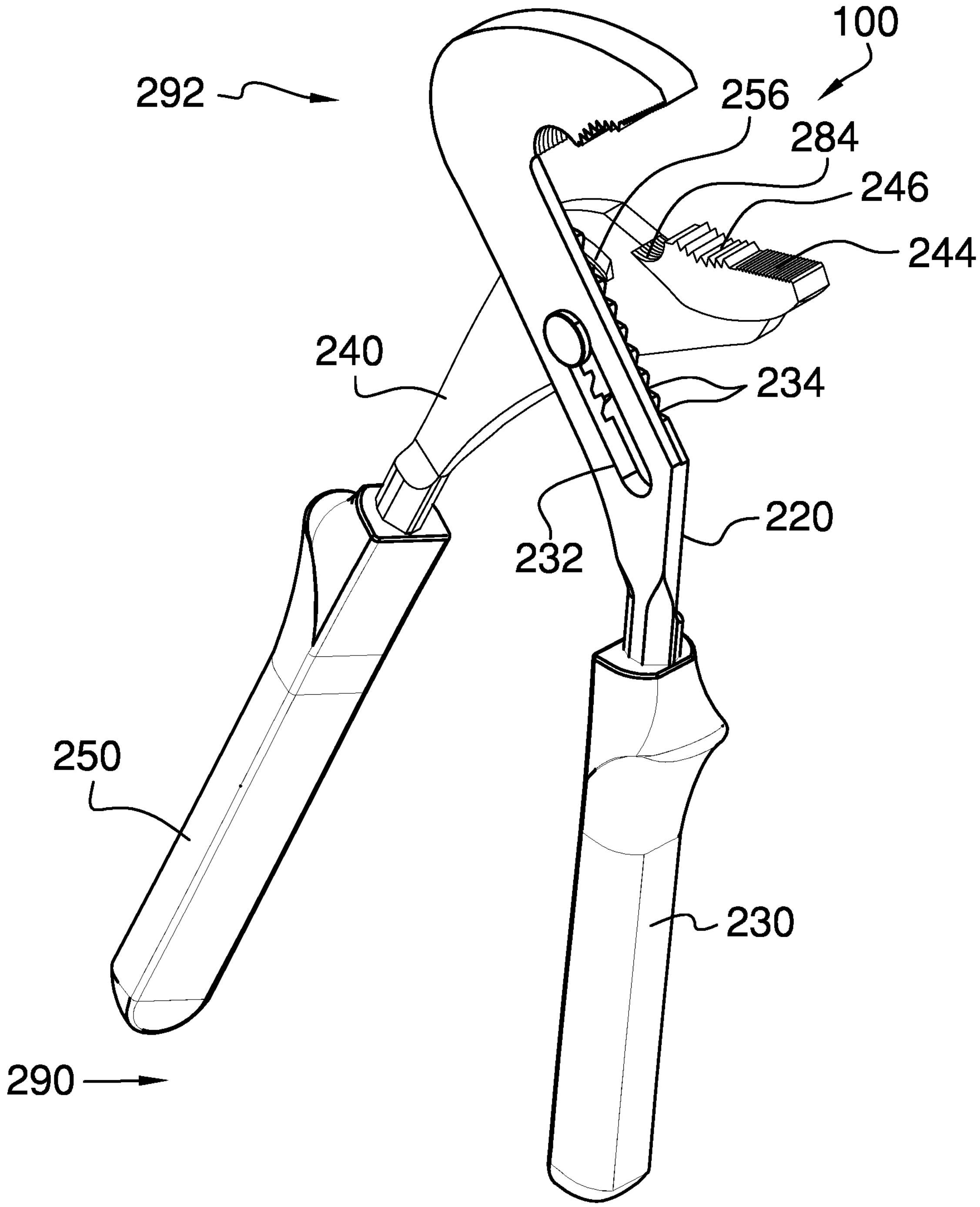
FIG. 1 is an isometric view of an embodiment of the disclosure.
Figure 2:
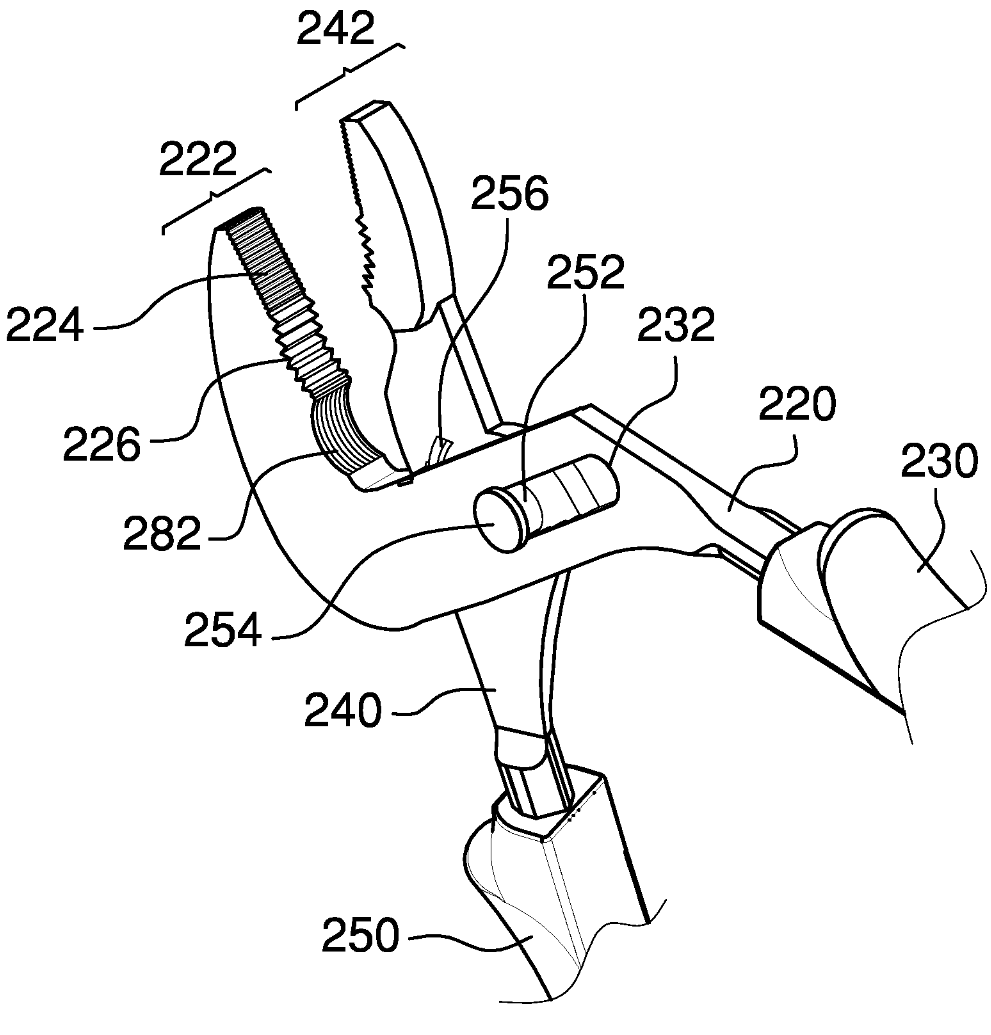
FIG. 2 is a bottom isometric view of an embodiment of the disclosure.
Figure 3:
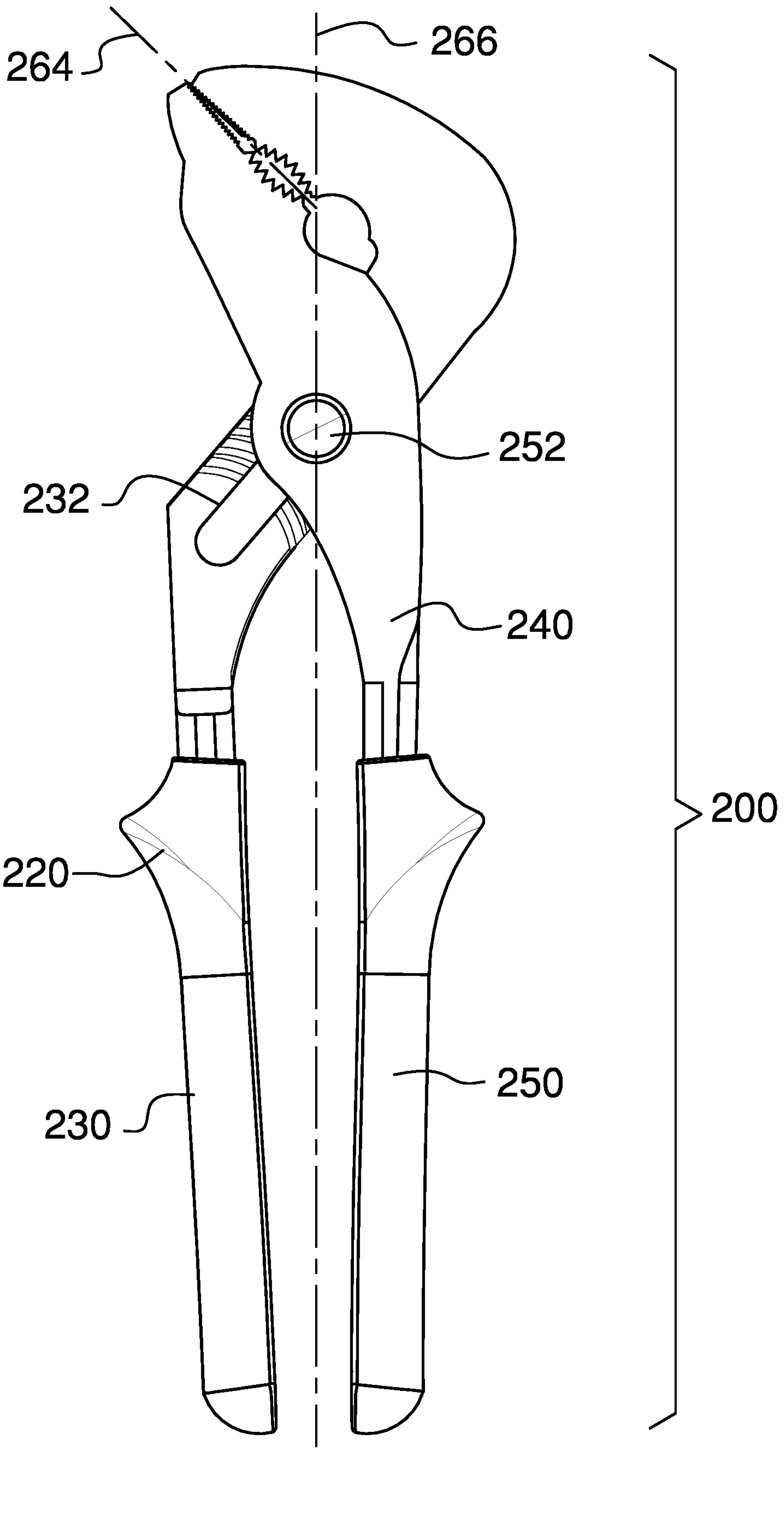
FIG. 3 is a right side view of an embodiment of the disclosure.
Figure 4:
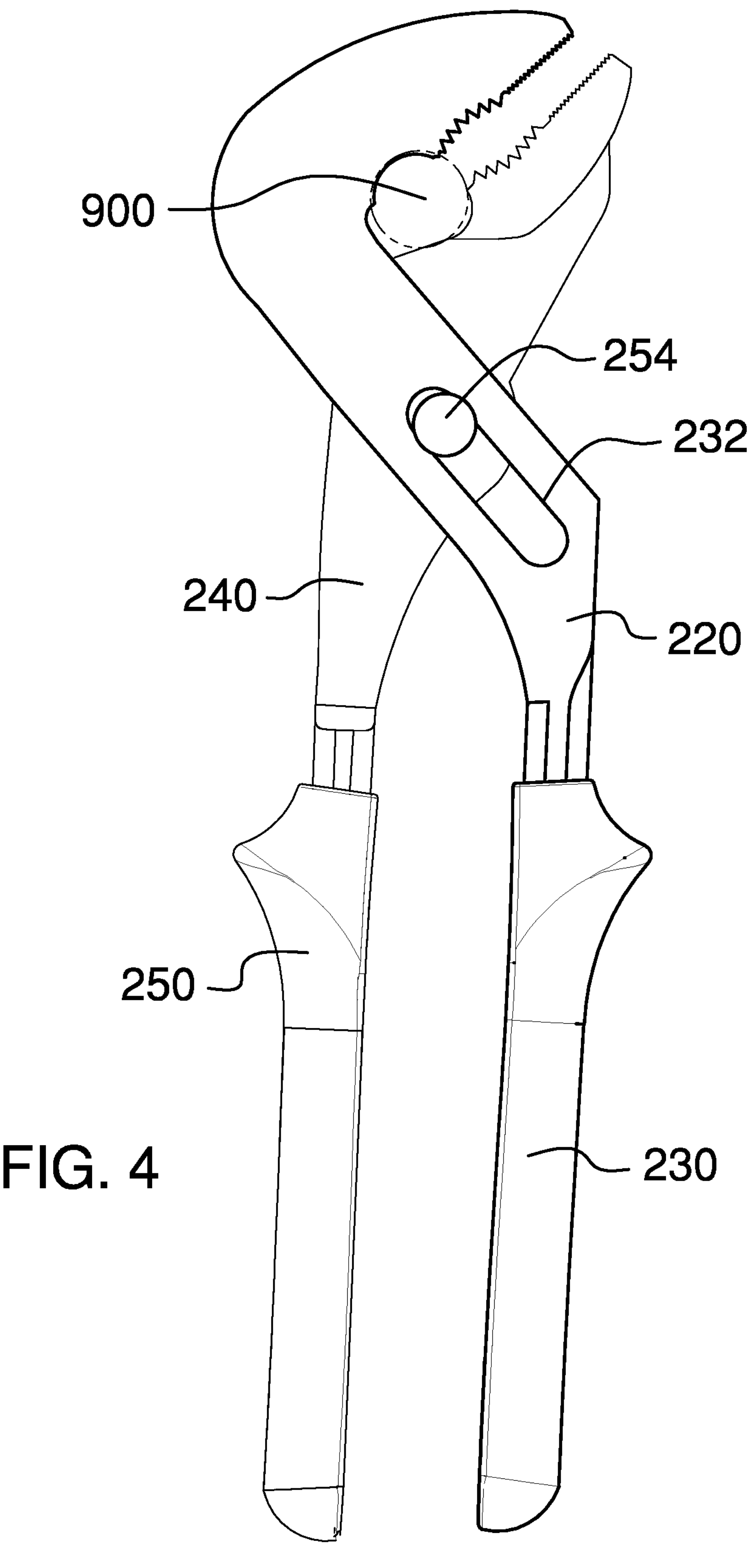
FIG. 4 is a left side view of an embodiment of the disclosure.

Detailed reference will now be made to a first potential embodiment of the disclosure, which is illustrated in FIGS. 1 through 4.

The adjustable pliers with thread-engaging means 100 (hereinafter invention) comprise water pump pliers 200 and a thread-engaging means. The water pump pliers 200 may be slip joint pliers whose fulcrum may be moved to modify the distance that the plier's jaws may open. The jaws may be angled with respect to a central axis 266 of the water pump pliers 200. The thread-engaging means may comprise opposing arcuate grooves that are longitudinally oriented on a first jaw 222 and on a second jaw 242. The thread-engaging means may be operable to grasp a threaded element 900 that is held between the first jaw 222 and the second jaw 242 and is laterally oriented relative to the water pump pliers 200 without damaging threads of the threaded element 900. As non-limiting examples, the threaded element 900 may be a bolt, a screw, or a threaded rod. The water pump pliers 200 are well known hand tools. They are also commonly called groove joint pliers or tongue and groove pliers.

Note that within this document "top" refers to the end of the water pump pliers 200 that comprise the jaws and "bottom" refers to the end of the water pump pliers 200 that comprise the hand grips. "Front" refers to the side of the water pump pliers 200 where the jaws open and "rear' refers to the side of the water pump pliers 200 opposite the jaws. "Held for use" may refer to the water pump pliers 200 being held upright in front of a user with the jaws facing away from the user. "Left" and "right" refer to the sides of the water pump pliers 200 that would be on the user's left side and the user's right side, respectively, when the water pump pliers 200 being held for use.

The water pump pliers 200 may comprise a first handle 220 and a second handle 240, collectively referred to as handles. The first handle 220 may be the frontmost handle and the second handle 240 may be the rearmost handle when the water pump pliers 200 are held for use. The first handle 220 and the second handle 240 may pivot at the fulcrum to open and close the jaws. The jaws may comprise the first jaw 222 and the second jaw 242. The jaws may comprise toothed surfaces disposed between a proximal end 290 of the jaws and a distal end 292 of the jaws to reduce movement of an item being held by the water pump pliers 200.

The first handle 220 may bend rearwards below a guide slot 232 such that the distal end 292 of the first handle 220 is oriented to be parallel to the second handle 240 when the water pump pliers 200 are closed. The first jaw 222 may extend upwards above the guide slot 232 and may curve toward the front such that the first jaw 222 is positioned above the second jaw 242.

The first jaw 222 may comprise a first flat serrated surface 224 and a first curved serrated surface 226. The first flat serrated surface 224 and the first curved serrated surface 226 may be located on the bottom of the first jaw 222. The first flat serrated surface 224 may be closest to the distal end 292 of the first jaw 222. The first flat serrated surface 224 may be a planar surface. The first flat serrated surface 224 may comprise a set of teeth that are laterally oriented across the first flat serrated surface 224. The first curved serrated surface 226 may be located adjacent to the first flat serrated surface 224 on the proximal side of the first flat serrated surface 224. The first curved serrated surface 226 may be a singly-curved surface oriented to show a convex curve when viewed from a side of the water pump pliers 200. The first curved serrated surface 226 may comprise a set of teeth that are laterally oriented across the first curved serrated surface 226.

The first handle 220 may comprise a plurality of grooves 234 that are curved with the ends of an individual groove lower than the center of the individual groove when the water pump pliers 200 are held for use. The plurality of grooves 234 may be on the side of the first handle 220 that is adjacent the second handle 240 and located at a midpoint between a first hand grip 230 and the first jaw 222.

The guide slot 232 may be an elongated aperture on the first handle 220. The guide slot 232 may be longitudinally oriented along the first handle 220 and at a midpoint between the first hand grip 230 and the first jaw 222.

The second jaw 242 may extend forward above a pivot pin 252 such that the second jaw 242 is positioned below the first jaw 222.

The second jaw 242 may comprise a second flat serrated surface 244 and a second curved serrated surface 246. The second flat serrated surface 244 and the second curved serrated surface 246 may be located on the top of the second jaw 242. The second flat serrated surface 244 may be closest to the distal end 292 of the second jaw 242. The second flat serrated surface 244 may be a planar surface. The second flat serrated surface 244 may comprise a set of teeth that are laterally oriented across the second flat serrated surface 244. The second curved serrated surface 246 may be located adjacent to the second flat serrated surface 244 on the proximal side of the second flat serrated surface 244. The second curved serrated surface 246 may be a singly-curved surface oriented to show a convex curve when viewed from a side of the water pump pliers 200. The second curved serrated surface 246 may comprise a set of teeth that are laterally oriented across the second curved serrated surface 246.

The second handle 240 may comprise a tongue 256 that is curved with the ends of the tongue 256 lower than the center of the tongue 256 when the water pump pliers 200 are held for use. The tongue 256 may be on the side of the second handle 240 that is adjacent the first handle 220 and may be located above the pivot pin 252. The size and curvature of the tongue 256 may complement the size and curvature of the plurality of grooves 234 on the first handle 220 such that the tongue 256 may slide through one of the plurality of grooves 234 when the handles pivot.

The first flat serrated surface 224 and the first curved serrated surface 226 on the first jaw 222 may oppose the second flat serrated surface 244 and the second curved serrated surface 246 on the second jaw 242, respectively, such that the item being held by the water pump pliers 200 may be grasped between the first flat serrated surface 224 and the second flat serrated surface 244 or between the first curved serrated surface 226 and the second curved serrated surface 246.

The first handle 220 may comprise the first hand grip 230 and the second handle 240 may comprise a second hand grip 250. The first hand grip 230 and the second hand grip 250 may be adapted to increase friction with the user's hand.

The pivot pin 252 may be the fulcrum that the handles pivot about. The pivot pin 252 may be coupled to the second handle 240 and may extend perpendicularly from the second handle 240 through the guide slot 232 in the first handle 220. A pivot pin head 254 at the end of the pivot pin 252 may prevent the pivot pin 252 from pulling out of the first handle 220.

The first jaw 222 and the second jaw 242 may meet along a straight line 264 when the jaws are closed. The jaws may be canted such that the straight line 264 and the central axis 266 of the water pump pliers 200 form an angle that measures between 40 degrees and 65 degrees.

A size-adjusting means may be operable to increase and decrease the size of the opening between the first jaw 222 and the second jaw 242. The size of the opening of the jaws may vary when the first handle 220 moves longitudinally relative to the second handle 240 with the pivot pin 252 sliding along the guide slot 232. The size-adjusting means may comprise the tongue 256 and the plurality of grooves 234. The tongue 256 may engage one of the plurality of grooves 234 when the water pump pliers 200 are not fully open such that the first handle 220 may be inhibited from moving longitudinally relative to the second handle 240 because the tongue 256 is restrained from moving longitudinally by the plurality of grooves 234. When the water pump pliers 200 are fully open, the tongue 256 may disengage from the plurality of grooves 234 and the first handle 220 may be permitted to slide longitudinally relative to the second handle 240.

The thread-engaging means may comprise a first threaded surface 282 located on the first jaw 222 and a second threaded surface 284 located on the second jaw 242 such that the first threaded surface 282 opposes the second threaded surface 284.

The first threaded surface 282 may be located adjacent to the first curved serrated surface 226 on the proximal side of the first curved serrated surface 226. The first threaded surface 282 may be a singly-curved surface oriented to show a convex curve when viewed from a side of the water pump pliers 200. The first threaded surface 282 may comprise a set of threads that are longitudinally oriented along the curve of the first threaded surface 282

The second threaded surface 284 may be located adjacent to the second curved serrated surface 246 on the proximal side of the second curved serrated surface 246. The second threaded surface 284 may be a singly-curved surface oriented to show a convex curve when viewed from a side of the water pump pliers 200. The second threaded surface 284 may comprise a set of threads that are longitudinally oriented along the curve of the second threaded surface 284

The first threaded surface 282 and the second threaded surface 284 may be oriented to engage with the threads of the threaded element 900 that is placed laterally across the thread-engaging means such that the threaded element 900 may be held between the first threaded surface 282 and the second threaded surface 284.

The first threaded surface 282 and the second threaded surface 284 may be compatible with the threaded elements 900 having specific thread characteristics. As non-limiting examples, the handedness, pitch, angle, and thread depth of the first threaded surface 282 and the second threaded surface 284 may be selected to match the threaded element 900. The water pump pliers 200 may be offered as a family of the water pump pliers 200 where each member of the family of the water pump pliers 200 is complements a different set of the thread characteristics.

In use, the water pump pliers 200 may be used to grasp an item between the first jaw 222 and the second jaw 242, which oppose each other. The item may be grasped between the first flat serrated surface 224 and the second flat serrated surface 244 or between the first curved serrated surface 226 and the second curved serrated surface 246. If the item is a threaded element 900 that must be held without damaging the threads of the threaded element 900, the threaded element 900 may be oriented laterally and may be placed between the first threaded surface 282 and the second threaded surface 284.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, a "cant" may be an angular deviation from one or more reference planes such as a vertical plane or a horizontal plane.

As used herein, "complement" or "complementary" may refer to a compatibility between two threaded parts such that the gender, handedness, form, angle, pitch, diameter, and thread depth of both threads are compatible for the parts to mate by screwing the threads together.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "fulcrum" may be a support around which a lever or other structure rotates.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead may be within 50% of the distance from the exact midpoint to the farthest edge, farthest end, or farthest corner.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, a "slot" may be a long narrow groove, cut, opening, or aperture that is formed in or through an object.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An adjustable pliers with thread-engaging means comprising:

water pump pliers and a thread-engaging means;

wherein the water pump pliers are slip joint pliers whose fulcrum is moved to modify a distance that jaws opens;

wherein the jaws are angled with respect to a central axis of the water pump pliers;

wherein the thread-engaging means comprises arcuate grooves that are longitudinally oriented on a first jaw and on a second jaw;

wherein the thread-engaging means is operable to grasp a threaded element that is held between the first jaw and the second jaw and is laterally oriented relative to the water pump pliers without damaging threads of the threaded element;

wherein the water pump pliers comprise a first handle and a second handle, collectively referred to as handles;

wherein the first jaw comprises a first flat serrated surface and a first curved serrated surface and the second jaw comprises a second flat serrated surface and a second curved serrated surface, wherein the flat serrated surfaces and the curved serrated surfaces are located on the bottom of the respective jaw, wherein the flat serrated surfaces are closest to the distal end of the respective jaw, wherein the flat serrated surfaces are planar surfaces, wherein the flat serrated surfaces, each comprises a set of teeth that are laterally oriented across the respective flat serrated surface, wherein the curved serrated surfaces are located adjacent to the respective flat serrated surface on the proximal side of said respective flat serrated surface, wherein each of the curved serrated surfaces, is a singly-curved surface oriented to show a convex curve when viewed from a side of the water pump pliers and wherein each of curved serrated surface comprises a set of teeth that are laterally oriented across the respective curved serrated surface;

wherein the thread-engaging means comprises a first threaded surface located on the first jaw and a second threaded surface located on the second jaw such that the first threaded surface opposes the second threaded surface;

wherein the first threaded surface is located adjacent to the first curved serrated surface on the proximal side of the first curved serrated surface, wherein the first threaded surface is a singly-curved surface oriented to show a convex curve when viewed from a side of the water pump pliers and wherein the first threaded surface comprises a set of threads that are longitudinally oriented along the curve of the first threaded surface;

wherein the second threaded surface is located adjacent to the second curved serrated surface on the proximal side of the second curved serrated surface, wherein the second threaded surface is a singly-curved surface oriented to show a convex curve when viewed from a side of the water pump pliers, wherein the second threaded surface comprises a set of threads that are longitudinally oriented along the curve of the second threaded surface; and wherein the first threaded surface and the second threaded surface engage with the threads of the threaded element that is placed laterally across the thread-engaging means such that the threaded element is held between the first threaded surface and the second threaded surface.

2. The adjustable pliers with thread-engaging means according to claim 1 wherein the first handle and the second handle pivot at the fulcrum to open and close the jaws;

wherein the jaws comprise the first jaw and the second jaw; wherein the jaws comprise toothed surfaces disposed between a proximal end of the jaws and a distal end of the jaws to reduce movement of an item being held by the water pump pliers.

3. The adjustable pliers with thread-engaging means according to claim 2 wherein the first handle bends rearwards below a guide slot such that the distal end of the first handle is oriented to be parallel to the second handle when the water pump pliers are closed.

4. The adjustable pliers with thread-engaging means according to claim 3 wherein the first jaw extends upwards above the guide slot and curves toward the front such that the first jaw is positioned above the second jaw.

5. The adjustable pliers with thread-engaging means according to claim 1 wherein the first handle comprises a plurality of grooves that are curved with the ends of an individual groove lower than the center of the individual groove;

wherein the plurality of grooves are on the side of the first handle that is adjacent the second handle and located at a midpoint between a first hand grip and the first jaw.

6. The adjustable pliers with thread-engaging means according to claim 5 wherein the guide slot is an elongated aperture on the first handle;

wherein the guide slot is longitudinally oriented along the first handle and at a midpoint between the first hand grip and the first jaw.

7. The adjustable pliers with thread-engaging means according to claim 6 wherein the second jaw extends forward above a pivot pin such that the second jaw is positioned below the first jaw.

8. The adjustable pliers with thread-engaging means according to claim 1 wherein the second handle comprises a tongue that is curved with the ends of the tongue lower than the center of the tongue;

wherein the tongue is on the side of the second handle that is adjacent the first handle and is located above the pivot pin;

wherein the size and curvature of the tongue complement the size and curvature of the plurality of grooves on the first handle such that the tongue slides through one of the plurality of grooves when the handles pivot.

9. The adjustable pliers with thread-engaging means according to claim 8 wherein the first flat serrated surface and the first curved serrated surface on the first jaw oppose the second flat serrated surface and the second curved serrated surface on the second jaw, respectively, such that the item being held by the water pump pliers is grasped between the first flat serrated surface and the second flat serrated surface or between the first curved serrated surface and the second curved serrated surface.

10. The adjustable pliers with thread-engaging means according to claim 9 wherein the pivot pin is the fulcrum that the handles pivot about;

wherein the pivot pin is coupled to the second handle and extends perpendicularly from the second handle through the guide slot in the first handle;

wherein a pivot pin head at the end of the pivot pin prevents the pivot pin from pulling out of the first handle.

11. The adjustable pliers with thread-engaging means according to claim 10 wherein the first jaw and the second jaw meet along a straight line when the jaws are closed;

wherein the jaws are canted such that the straight line and the central axis of the water pump pliers form an angle that measures between 40 degrees and 65 degrees.

12. The adjustable pliers with thread-engaging means according to claim 11 wherein a size-adjusting means is operable to increase and decrease the size of the opening between the first jaw and the second jaw;

wherein the size of the opening of the jaws varies when the first handle moves longitudinally relative to the second handle with the pivot pin sliding along the guide slot; wherein the size-adjusting means comprises the tongue and the plurality of grooves;

wherein the tongue engages one of the plurality of grooves when the water pump pliers are not fully open such that the first handle is inhibited from moving longitudinally relative to the second handle because the tongue is restrained from moving longitudinally by the plurality of grooves;

wherein when the water pump pliers are fully open, the tongue disengages from the plurality of grooves and the first handle is permitted to slide longitudinally relative to the second handle.

13. The adjustable pliers with thread-engaging means according to claim 1 wherein the first threaded surface and the second threaded surface are compatible with the threaded elements having specific thread characteristics.

* * * * *